United States Patent [19]

Lörcks et al.

[11] Patent Number: 5,525,281
[45] Date of Patent: Jun. 11, 1996

[54] METHOD FOR PREPARING BIODEGRADABLE FILMS FROM PLANT-BASED RAW MATERIALS

[75] Inventors: Jürgen Lörcks, Rees; Winfried Pommeranz, Enger; Joachim Heuer, Kranenburg; Kurt Klenke, Kleve; Harald Schmidt, Emmerich, all of Germany

[73] Assignee: Biotec Biologische Naturverpackungen GmbH & Co., Emmerich, Germany

[21] Appl. No.: 392,753

[22] PCT Filed: Aug. 24, 1993

[86] PCT No.: PCT/EP93/02270

§ 371 Date: Mar. 15, 1995

§ 102(e) Date: Mar. 15, 1995

[87] PCT Pub. No.: WO94/04600

PCT Pub. Date: Mar. 3, 1994

[30] Foreign Application Priority Data

Aug. 24, 1992 [DE] Germany .......................... 42 28 016.8

[51] Int. Cl.$^6$ ........................................ B29C 47/76
[52] U.S. Cl. .......................... 264/101; 127/32; 127/34; 264/564; 264/211.11; 264/211.24; 264/330; 428/532
[58] Field of Search ................... 264/211.11, 330, 264/101, 211.23–24, 564; 106/210–211; 127/32, 34; 428/532

[56] References Cited

U.S. PATENT DOCUMENTS

| | | | |
|---|---|---|---|
| 3,243,308 | 3/1966 | Barger et al. | 106/213 |
| 4,076,846 | 2/1978 | Nakatsuka et al. | 426/62 |
| 4,965,081 | 10/1990 | Lazarus | 426/242 |
| 5,254,607 | 10/1993 | McBride et al. | 524/52 |
| 5,275,774 | 1/1994 | Bahr et al. | 264/211.11 |
| 5,281,276 | 1/1994 | Chiu et al. | 426/661 |
| 5,316,578 | 5/1994 | Buehler et al. | 106/210 |
| 5,405,564 | 4/1995 | Stepto et al. | 264/211.11 |
| 5,409,542 | 4/1995 | Henley et al. | 426/661 |
| 5,412,005 | 5/1995 | Bastioli et al. | 524/47 |

FOREIGN PATENT DOCUMENTS

| | | |
|---|---|---|
| 0252270 | 1/1988 | European Pat. Off. . |
| 0516030 | 2/1992 | European Pat. Off. . |
| 0474095 | 3/1992 | European Pat. Off. . |
| 50-86557 | 7/1975 | Japan ........... 264/217 |
| 2190093 | 11/1987 | United Kingdom . |
| 2208651 | 4/1989 | United Kingdom . |
| WO90/14938 | 12/1990 | WIPO . |
| WO93/06013 | 6/1993 | WIPO . |

*Primary Examiner*—Jeffery R. Thurlow
*Attorney, Agent, or Firm*—Parmelee, Bollinger & Bramblett; George W. Rauchfuss, Jr.

[57] ABSTRACT

There is provided a method for preparing biodegradable films from plant-based raw materials in the form of carbohydrates which method is continuous and carried out in one step. In the process the plant-based raw materials are modified and plastified and the films are prepared without interruption and in one step. The advantages of the invention reside in reduced shear stress of the starch molecules and thus in the improved properties of the films as well as in the cost-efficient, time-, energy- and space-saving manufacture.

20 Claims, 3 Drawing Sheets

METHOD FOR PREPARING BIODEGRADABLE FILMS FROM PLANT-BASED RAW MATERIALS

FIELD OF THE INVENTION

The invention relates to a method for preparing biodegradable films from plant-based raw materials. Such methods are gaining more and more importance, for example, in the production of environmentally compatible packing material. The object is to produce films having sufficient strength that can easily be disintegrated or dissolved into their original natural components.

BACKGROUND OF THE INVENTION

Methods for preparing thermoplastic granules by using starches have been disclosed previously (U.S. Pat. Nos. 4,133,784, 4,021,388, DE-A-23 22 440). Such granules are processed to films in a second procedural step. In so doing, the starch is used as filler material in synthetic polymers. Furthermore, methods for preparing and modifying destructured thermoplastic starch have been disclosed (EP-A-378 646, EP-A-397 819).

WO 90/05161 A1 shows thermoplastically processable starch as well as a method for preparing it. In the process aggregates and, if desired, various further additives are added to raw starch material to reduce the melting temperature of the starch to a level below its decomposition temperature. This is to improve the structure of the starch melt so as to facilitate handling in preparing and processing thermoplastic starch.

EP-A1-0 474 095 discloses a process of preparing biodegradable articles, such as dishes, cups, cardboard boxes, etc. using plant-based raw material, such as starch, as starting material. This material is supplemented with additives, plastified and converted in a first extruder to an intermediate to form a billet or granules. Then the intermediate is molded in a second extruder into the desired article.

Similarly, conventional film preparation from plant-based raw materials proceeds in two completely separate steps. The biopolymer melt destructured and plastified in the extrusion process is cooled at the end of the first step, forced through a die under high pressure and granulated. In order to avoid biopolymer foaming, it is required to cool the melt. The resulting high shear stress causes damage to the molecular structure of the starch while various molecule fragments are split off. The polymer chains of the starch are shortened and the molecular weight is reduced. The obtained starch granules are then processed to films in a further extrusion process subject to similar conditions. In the process the biopolymer is again decomposed as the molecular weight is reduced and the chains are shortened. The two-fold damage to the molecular structure, especially the shortening of the amylose chains, causes immediate deterioration of the properties (tensile strength, elasticity, etc.) of the thus obtained films. What is more, the two-fold extrusion is time-, energy- and cost-consuming.

By contrast, the object underlying the present invention is to provide a cost-efficient method for preparing biodegradable films from plant-based raw materials while avoiding the drawbacks of the prior art, improving the quality of the obtained films and achieving, for instance, high tensile strength and elasticity.

This object is achieved by providing the features indicated in the claims.

SUMMARY OF THE INVENTION

In achieving the object, the invention is based on the concept of optionally disintegrating and modifying plant-based raw materials, e.g., in the form of carbohydrates, in a continuous and one-step process without involving intermediates and without interruption, of plastifying as well as of compressing and molding them into films. A suitable configuration of a screw-type extruder to transport the film materials and suitable temperature conditions ensure careful processing of the biopolymers.

The plant-based raw materials can include carbohydrates, e.g., flour or native starch in natural or hybrid form-derived, for example, from potatoes, manioc, peas, beans, corn, wax corn, corn with high amylose content, grain such as wheat and fractions prepared therefrom, barley or sorghum, starch derivatives consisting of physically and/or chemically modified starch, cellulose derivatives, plant rubber (carbohydrate polymer), hemicellulose, polysaccharides, hydrocolloids or mixtures of one or more of those raw materials.

The invention has the following advantages.

The method of the invention reduces the shear strength, fragmentation and molecular weight loss of the biopolymers. As a result, the preparation process is considerably facilitated because the reaction extruder and the film preparation form a process unit. The storage of hygroscopic pellets in an aluminum compound under vacuum is no longer necessary. Compounding and film preparation occur in one step. The production is more cost-efficient as no packing and transportation of the pellets are required and as less personnel and equipment costs are incurred. In addition, energy for transporting and melting the pellets can be saved. The obtained films exhibit improved properties in comparison to the prior art.

BRIEF DESCRIPTION OF THE DRAWINGS

The invention is further illustrated below by means of drawings.

FIG. 1b shows a top view of a production line of the invention as shown in FIG. 1a.

FIG. 2b shows a top view of a production line of the invention as shown in FIG. 2a.

DETAILED DESCRIPTION OF THE INVENTION

Figure 1A:
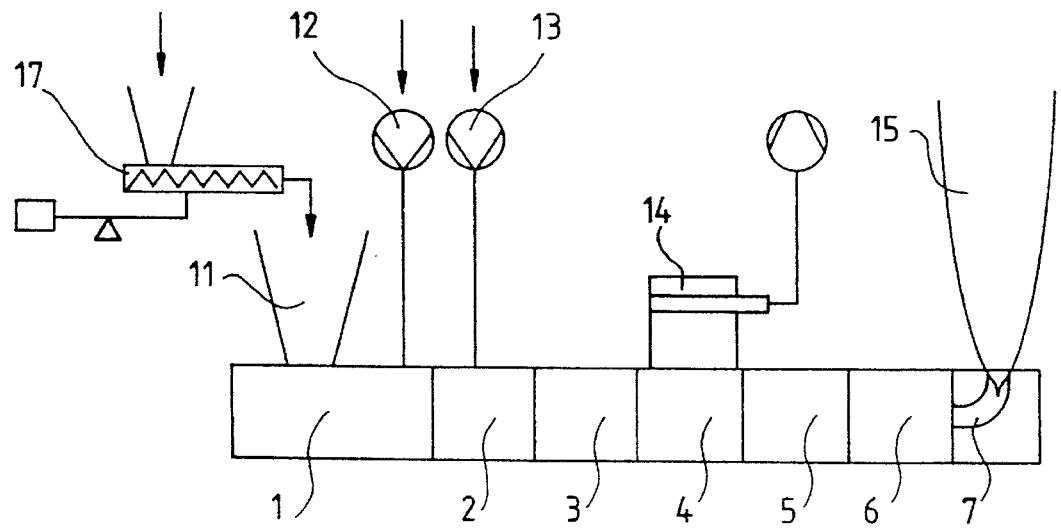
FIG. 1a shows a lateral view of a production line of the invention for the production of blown films.
Figure 1B:
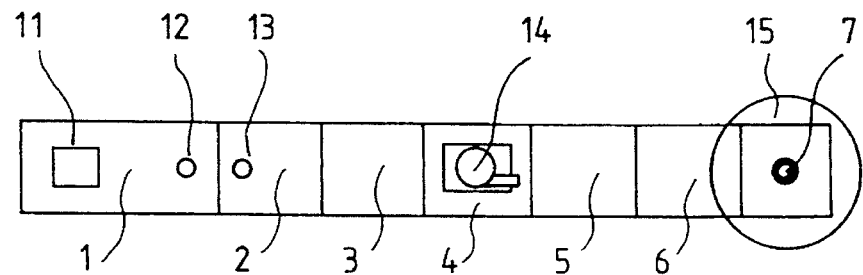
Figure 2A:
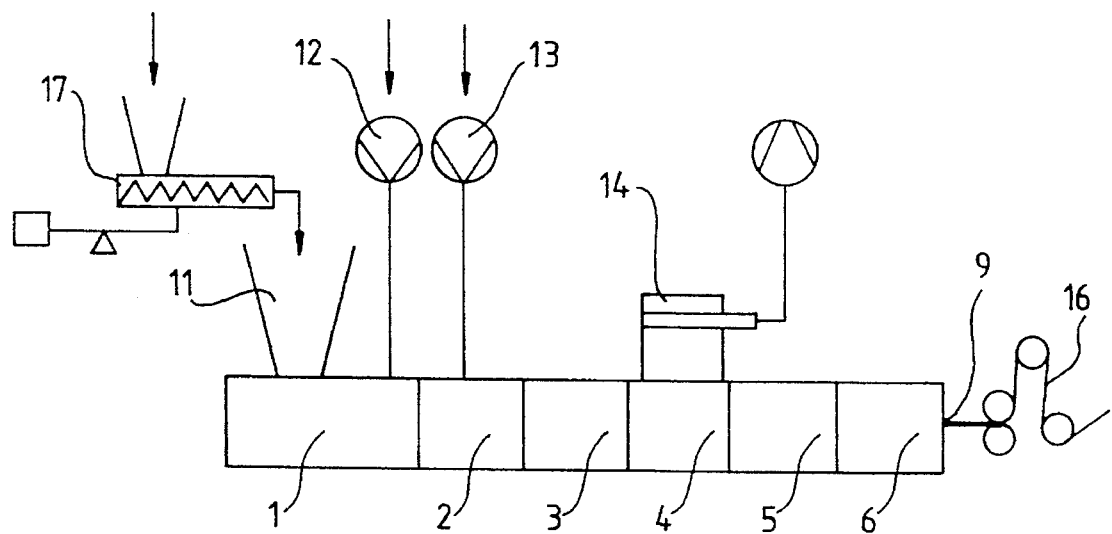
FIG. 2a shows a lateral view of a production line of the invention for the production of flat films.
Figure 2B:
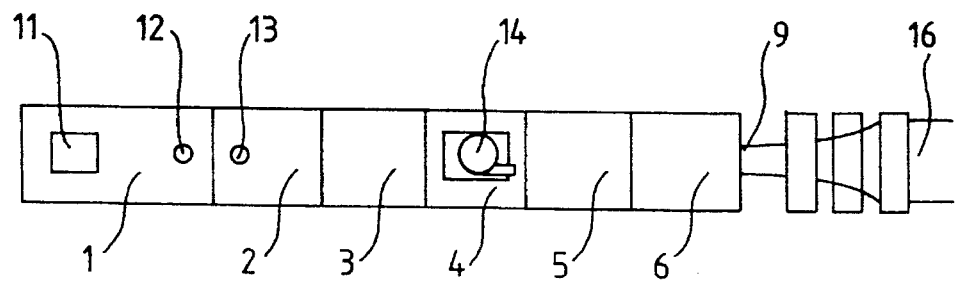

FIGS. 1a and 1b show a production line of the invention for the production of blown films in two views. Depicted are individual production sections 1 to 6 and a die 7 interconnected by a screw-type extruder (not shown) that transports and mixes or kneads the film materials. A mixture of solid plant-based raw materials and, if desired, additives is measured with a metering device 17 (only shown in FIG. 1a) and added via the first inlet 11 of the first section 1. At the same time, liquid additives can be added via the second inlet 12. Examples of additives include emulsifiers, plastifiers, preservatives and water. In section 2 the mixture is heated and kneaded. Liquid additives can be added via a third inlet 13. In a third section 3 the temperature is further increased and the plant-based raw materials are allowed to react with the additives, thus forming a melt. In a fourth section 4 the melt is evacuated in a vacuum apparatus 14 by allowing water to evaporate from the melt and thus causing the melt to cool down. The melt is further cooled in a fifth section 5. In a sixth section 6 the melt is compressed so as to cause a pressure built-up in the die and then blown through a tubular die 7 to form a film 15. A similar production line is depicted in FIGS. 2a and 2b (metering device 17 is only shown in FIG. 2a). The difference between FIGS. 2a, 2b and FIGS. 1a, 1b lies in the fact that a flat film 16 is molded by a flat die 9.

Figure 3A:
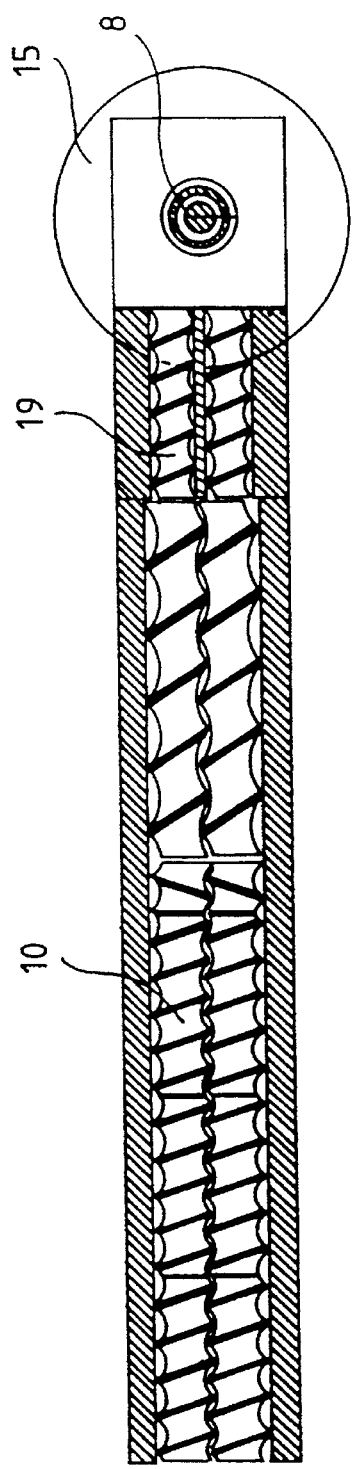
FIG. 3a shows an embodiment of the invention featuring the end of a screw-type extruder comprising a double tubular die.

FIG. 3a shows an embodiment of the invention wherein a blown film 15 is produced by means of a double tubular die 8. Two one-lead screws 19 are provided behind a double-lead screw 10 to transport the melt to the die 8.

Figure 3B:
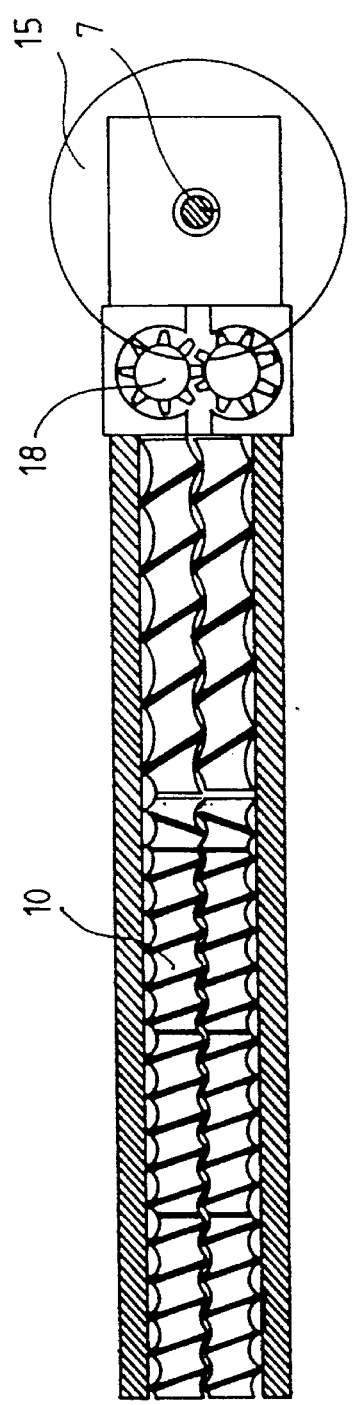
FIG. 3b shows an embodiment of the invention featuring the end of a screw-type extruder comprising a tubular die.

In FIG. 3b a blown film 15 is produced by means of a tubular die 7. The die is supplied with the melt by a gear pump 18 provided behind the double-lead screw 10.

Figure 3C:
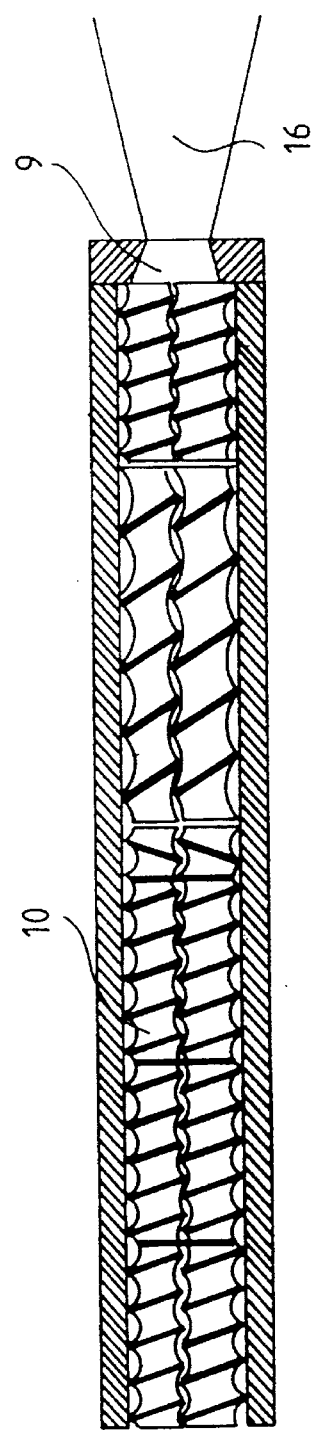
FIG. 3c shows an embodiment of the invention featuring the end of a screw-type extruder comprising a flat die.

In an embodiment comprising a flat die 9 for the production of a flat film 16 as shown in FIG. 3c the double-lead screw 10 feeds the melt directly to the die 9.

The screw-type extruder 10 is preferably shaped like a double-lead screw and preferably has the following configurations in each of sections 1 to 6: right-handed in sections 1 and 2; right- and left-handed in section 3 while optionally alternating several times; steeply right-handed in sections 4 and 5; and flatly right-handed in section 6. These differing configurations ensure controlled and differing transport rates, kneading and mixing in each of the sections and thus the desired careful handling of the biopolymers.

Sections 1 to 6 and dies 7, 8 or 9 exhibit a controlled temperature distribution. Preferred temperature conditions include: 50° C. in section 1; 80°–100° C. in section 2; 120°–160° C. in section 3; 120°–160° C. in section 4; 80° to 120° C. in section 5; 40°–60° C. in section 6; and 50° to 70° C. at dies 7, 8 or 9.

The embodiments of the method of the invention are shown below. A two-shaft screw-type extruder (ZSK 40) manufactured by Werner und Pfleiderer, Germany, was used.

EXAMPLE 1

A solids mixture comprising potato starch and an emulsifier (mono-diglyceride) as well as the liquid components water and glycerol were continuously added to the two-shaft screw-type extruder.

| Solids: | |
| --- | --- |
| Potato starch | 99% |
| Emulsifier | 1% |
| | 100% |
| Liquid additives: | |
| Water | 14% |
| Glycerol | 86% |
| | 100% |
| Mixing ratio during the process: | |
| Solids | 75% |
| Liquids | 25% |
| Temperature profile: | |
| Section 1: | 50° C. |
| Section 2: | 80° C. |
| Section 3: | 120° C. |
| Section 4: | 120° C. |
| Section 5: | 80° C. |
| Section 6: | 60° C. |
| Die: | 60° C. |
| RPM: | 170 min$^{-1}$ |
| Torque: | 30% |
| Pressure: | 80 bar |
| Blow ratio: | 1:4 |

A transparent film having the following properties was obtained:

| | |
| --- | --- |
| Film thickness: | 35 μm |
| Tensile strength along length: | 12.1 N/mm$^2$ |
| Tensile strength along width: | 11.8 N/mm$^2$ |
| Duration of dissolution of 10 g of film in 100 g of water at 20° C.: | 15 minutes |

EXAMPLE 2

A solids mixture comprising potato starch and an emulsifier (mono-diglyceride) as well as the liquid components water and glycerol were continuously added to the two-shaft screw-type extruder.

| Solids: | |
| --- | --- |
| Potato starch | 99% |
| Emulsifier | 1% |
| | 100% |
| Liquid additives: | |
| Water | 20% |
| Glycerol | 80% |
| | 100% |
| Mixing ratio during the process: | |
| Solids | 75% |
| Liquids | 25% |
| Temperature profile: | |
| Section 1: | 50° C. |
| Section 2: | 80° C. |
| Section 3: | 140° C. |
| Section 4: | 140° C. |
| Section 5: | 100° C. |
| Section 6: | 60° C. |
| Die: | 60° C. |
| RPM: | 170 min$^{-1}$ |
| Torque: | 20% |
| Pressure: | 60 bar |
| Blow ratio: | 1:4 |

A transparent film having the following properties was obtained:

| | |
| --- | --- |
| Film thickness: | 30 μm |
| Tensile strength along length: | 10.2 N/mm$^2$ |
| Tensile strength along width: | 9.4 N/mm$^2$ |
| Duration of dissolution of 10 g of film in 100 g of water at 20° C.: | 11 minutes |

EXAMPLE 3

A solids mixture comprising potato starch and an emulsifier (mono-diglyceride) as well as the liquid components water and glycerol were continuously added to the two-shaft screw-type extruder.

| Solids: | |
| --- | --- |
| Potato starch | 99% |
| Emulsifier | 1% |
| | 100% |
| Liquid additives: | |
| Water | 10% |
| Glycerol | 90% |
| | 100% |
| Mixing ratio during the process: | |
| Solids | 75% |
| Liquids | 25% |
| Temperature profile: | |
| Section 1: | 50° C. |
| Section 2: | 80° C. |
| Section 3: | 160° C. |
| Section 4: | 160° C. |
| Section 5: | 120° C. |
| Section 6: | 60° C. |
| Die: | 60° C. |
| RPM: | 230 min$^{-1}$ |
| Torque: | 15% |
| Pressure: | 52 bar |
| Blow ratio: | 1:4 |

A transparent film having the following properties was obtained:

| | |
| --- | --- |
| Film thickness: | 33 μm |
| Tensile strength along length: | 9.4 N/mm$^2$ |
| Tensile strength along width: | 8.2 N/mm$^2$ |
| Duration of dissolution of 10 g of film in 100 g of water at 20° C.: | 8 minutes |

EXAMPLE 4

A solids mixture comprising corn starch and an emulsifier (mono-diglyceride) as well as the liquid components water and glycerol were continuously added to the two-shaft screw-type extruder.

| Solids: | |
| --- | --- |
| Corn starch | 98% |
| Emulsifier | 2% |
| | 100% |
| Liquid additives: | |
| Water | 14% |
| Glycerol | 86% |
| | 100% |
| Mixing ratio during the process: | |
| Solids | 70% |
| Liquids | 30% |
| Temperature profile: | |
| Section 1: | 50° C. |
| Section 2: | 80° C. |
| Section 3: | 140° C. |
| Section 4: | 140° C. |
| Section 5: | 100° C. |
| Section 6: | 60° C. |
| Die: | 60° C. |
| RPM: | 200 min$^{-1}$ |
| Torque: | 18% |
| Pressure: | 45 bar |
| Blow ratio: | 1:3 |

An opaque film having the following properties was obtained:

| | |
| --- | --- |
| Film thickness: | 42 μm |
| Tensile strength along length: | 8.2 N/mm$^2$ |
| Tensile strength along width: | 6.8 N/mm$^2$ |
| Duration of dissolution of 10 g of film in 100 g of water at 20° C.: | 24 minutes |

EXAMPLE 5

A solids mixture comprising wheat flour and an emulsifier (mono-diglyceride) as well as the liquid components water and glycerol were continuously added to the two-shaft screw-type extruder.

| Solids: | |
| --- | --- |
| Type 405 wheat flour | 98% |
| Emulsifier | 2% |
| | 100% |
| Liquid additives: | |
| Water | 25% |
| Glycerol | 75% |
| | 100% |
| Mixing ratio during the process: | |
| Solids | 70% |
| Liquids | 30% |
| Temperature profile: | |
| Section 1: | 50° C. |
| Section 2: | 80° C. |
| Section 3: | 140° C. |
| Section 4: | 140° C. |
| Section 5: | 100° C. |
| Section 6: | 60° C. |
| Die: | 60° C. |
| RPM: | 200 min$^{-1}$ |
| Torque: | 20% |
| Pressure: | 55 bar |

The material was molded by a flat slot die and drawn out to a film.

An opaque film having the following properties was obtained:

| | |
| --- | --- |
| Film thickness: | 94 μm |
| Tensile strength along length: | 9.6 N/mm$^2$ |
| Tensile strength along width: | 9.0 N/mm$^2$ |
| Duration of dissolution of 10 g of film in 100 g of water at 20° C.: | 64 minutes |

EXAMPLE 6

A solids mixture comprising potato starch and an emulsifier (mono-diglyceride) as well as the liquid components water and glycerol were continuously added to the two-shaft screw-type extruder. At the end of the two-shaft section the material was fed to a tubular die via a gear pump.

| Solids: | |
| --- | --- |
| Potato starch | 99% |
| Emulsifier | 1% |
| | 100% |
| Liquid additives: | |
| Water | 14% |
| Glycerol | 86% |
| | 100% |
| Mixing ratio during the process: | |
| Solids | 80% |
| Liquids | 20% |
| Temperature profile: | |
| Section 1: | 50° C. |
| Section 2: | 100° C. |
| Section 3: | 140° C. |
| Section 4: | 140° C. |
| Section 5: | 80° C. |
| Section 6: | 40° C. |
| Die: | 50° C. |
| RPM: | 200 min$^{-1}$ |
| Torque: | 62% |
| Pressure at pump inlet: | 80 bar |
| Pressure at pump outlet: | 210 bar |
| Blow ratio: | 1:4 |

A transparent film having the following properties was obtained:

| Film thickness: | 29 μm |
| --- | --- |
| Tensile strength along length: | 14.1 N/mm$^2$ |
| Tensile strength along width: | 12.6 N/mm$^2$ |
| Duration of dissolution of 10 g of film in 100 g of water at 20° C.: | 10 minutes |

EXAMPLE 7

A solids mixture comprising potato starch and an emulsifier (mono-diglyceride) as well as the liquid components water and glycerol were continuously added to the two-shaft screw-type extruder. At the end of the two-shaft section the material was passed on to two one-lead screws and from there on fed to a double tubular die 8. In the screws two concentric tubes were formed from the two product flows, the thus obtained tubes were immediately laminated one on top of the other and together blown to a film.

| Solids: | |
| --- | --- |
| Potato starch | 99% |
| Emulsifier | 1% |
| | 100% |
| Liquid additives: | |
| Water | 20% |
| Glycerol | 80% |
| | 100% |
| Mixing ratio during the process: | |
| Solids | 75% |
| Liquids | 25% |
| Temperature profile: | |
| Section 1: | 50° C. |
| Section 2: | 100° C. |
| Section 3: | 120° C. |
| Section 4: | 120° C. |
| Section 5: | 80° C. |
| Section 6: | 60° C. |
| Die: | 70° C. |
| RPM: | 160 min$^{-1}$ |
| Torque: | 44% |
| Pressure: | 50 bar |
| Blow ratio: | 1:4 |

A transparent film having the following properties was obtained:

| Film thickness: | 38 μm |
| --- | --- |
| Tensile strength along length: | 11.4 N/mm$^2$ |
| Tensile strength along width: | 9.4 N/mm$^2$ |
| Duration of dissolution of 10 g of film in 100 g of water at 20° C.: | 31 minutes |

We claim:

1. A method for preparing biodegradable films from plant-based raw materials, preferably in the form of carbohydrates by means of a screw-type extruder, wherein modification or disintegration and the plastification of the plant-based raw materials and subsequent film preparation are done continuously and in one step comprising the stages of:
    a. continuously adding measured plant-based raw materials and, if desired, solid additives through a first inlet (11) as well as, if desired, liquid additives through a second inlet (12) in a first extruder section (1) and mixing them to form a mixture,
    b. heating and kneading the mixture in a second extruder section (2),
    c. heating and reacting the mixture in a third extruder section (3) to form a melt,
    d. evacuating said melt in a vacuum apparatus (14) in a fourth extruder section (4) by extracting and allowing water to evaporate from the melt, thus causing the melt to cool down,
    e. further cooling the melt in a fifth extruder section (5),
    f. compressing the melt in a sixth extruder section (6),
    g. extruding the melt from the extruder through a die (7, 8, 9) to form a film (15, 16).

2. A method as defined in claim 1 wherein in stage b. liquid additives are added through a third inlet (13).

3. A method as defined in claim 1 wherein the plant-based raw materials is selected from the group consisting of flour or native starch in natural or hybrid form derived from potatoes, manioc, peas, beans, corn, wax corn, corn with high amylose content, grain selected from wheat and fractions prepared therefrom, barley or sorghum, starch derivatives consisting of physically or chemically modified starch, cellulose derivatives, plant rubber, hemicellulose, polysaccharides, hydrocolloids or mixtures of one or more of those raw materials.

4. A method as defined in claim 1 wherein the temperature is selectively adjustable in the first to sixth sections (1 to 6).

5. A method as defined in claim 1 wherein the die is a tubular die (7) and a blown film (15) is molded.

6. A method as defined in claim 1 wherein the die is a double tubular die (8) and a blown film (15) is molded.

7. A method as defined in claim 1 wherein the die is a flat slot die (9) and a flat film (16) is molded.

8. A method as defined in claim 1 wherein a metering device (17) for the plant-based raw materials and additives is provided in front of the first inlet (11).

9. A method as defined claim 1 wherein a gear pump (18) or at least one one-lead screw (19) is provided between the screw-type extruder (10) and the die (7, 8, 9).

10. A method as defined in claim 1 wherein the screw-type extruder (10) is a two-shaft screw-type extruder.

11. A method as defined in claim 10 wherein the two-shaft screw-type extruder (10) has the following configuration:
   a. right-handed with a first slope in the first and second sections (1 and 2, respectively),
   b. right- and left-handed with the first slope in the third section (3) while alternating one or several times.
   c. steeply right-handed with a second slope in the fourth and fifth sections (4 and 5, respectively), and
   d. flatly right-handed with a third slope in the sixth section (6), wherein the second and the third slopes are greater and smaller, respectively, than the first slope.

12. A method as defined in claim 4 wherein the following temperature conditions are adhered to: 10° to 80° C., preferably 50° C., in the first section (1); 10° to 150° C., preferably 80° to 100° C., in the second section (2); 70° to 200° C., preferably 120° to 160° C., in the third section (3); 70° to 200° C., preferably 120° to 160° C., in the fourth section (4); 70° to 200° C., preferably 80° to 120° C., in the fifth section (5); 40° to 200° C., preferably 40° to 60° C., in the sixth section (6); 40° to 150° C., preferably 50° to 70° C., at the die (7; 8; 9).

13. A method as defined in claim 1 wherein the films in the dry state contain 40 to 100% by wt., preferably 75 to 95% by wt., of carbohydrates.

14. A method as defined in claim 1 wherein glycerolmonostearate is added as an additive preferably in the first section (1) to act as an emulsifier.

15. A method as defined in claim 1 wherein glycerol is added as an additive preferably in the second section (2) to act as a plastifier.

16. A method as defined in claim 1 wherein water is added as an additive preferably in the second section (2) to act as a solvent.

17. A method as defined in claim 4 wherein potassium sorbate is added as an additive preferably in the first section (1) to act as a preservative.

18. A method as defined in claim 1 wherein the films (15; 16) in the dry state contain 0 to 25% by wt., preferably 0.1 to 2.5% by wt., of glycerol monostearate, 0 to 40% by wt., preferably 10 to 28% by wt., of glycerol; and 0 to 5% by wt., preferably 0.1 to 0.5% by wt., of potassium sorbate.

19. A method as defined in claim 1 wherein the films (15; 16) contain 0 to 35% by wt., preferably 10 to 20% by wt., of water.

20. Films from plant-based raw materials producible by the method as defined in claim 1.

* * * * *